US006698962B2

United States Patent
Wang

(10) Patent No.: US 6,698,962 B2
(45) Date of Patent: Mar. 2, 2004

(54) JOINT FOR A TELESCOPING ROD

(75) Inventor: Chi-Chung Wang, Kaohsiung Hsien (TW)

(73) Assignee: Chi Yu Steel Co., Ltd., Kaohsiung Hsien (TW)

( * ) Notice: Subject to any disclaimer, the term of this patent is extended or adjusted under 35 U.S.C. 154(b) by 53 days.

(21) Appl. No.: 10/075,585

(22) Filed: Feb. 13, 2002

(65) Prior Publication Data
US 2003/0152419 A1 Aug. 14, 2003

(51) Int. Cl.[7] ............................. F16B 7/10; F16B 7/14
(52) U.S. Cl. ................. 403/109.4; 403/109.1; 403/109.2; 403/374.3; 403/377
(58) Field of Search ................ 403/21, 104, 108, 403/109.1, 109.4, 109.7, 110, 103, 362, 366, 377, 344, 315, 316, 370, 371, 373, 374.3, 374.1, 365; 248/188.1, 188.5, 188.7, 519

(56) References Cited

U.S. PATENT DOCUMENTS

| | | | | | |
|---|---|---|---|---|---|
| 1,309,375 | A | * | 7/1919 | Taylor | 248/413 |
| 2,327,990 | A | * | 8/1943 | Benson | 403/366 |
| 3,604,734 | A | * | 9/1971 | Friedman | 287/58 |
| 3,955,828 | A | * | 5/1976 | Boudreau | 280/279 |
| 4,140,415 | A | * | 2/1979 | Koyamato | 403/104 |
| 4,185,808 | A | * | 1/1980 | Donohoe et al. | 248/295 R |
| 4,576,501 | A | * | 3/1986 | McConnell | 403/59 |
| 4,818,135 | A | * | 4/1989 | Desjardins | 403/104 |
| 5,363,931 | A | * | 11/1994 | Moriarty | 175/325.5 |
| 5,542,773 | A | * | 8/1996 | Tu | 403/109 |
| 5,772,162 | A | * | 6/1998 | Lin | 248/121 |
| 6,345,794 | B1 | * | 2/2002 | Varner | 248/230.1 |
| 6,565,155 | B1 | * | 5/2003 | Huang | 297/353 |
| 6,578,804 | B2 | * | 6/2003 | Lin et al. | 248/188.7 |

FOREIGN PATENT DOCUMENTS

| | | | |
|---|---|---|---|
| EP | 0 094 520 A1 * | 11/1983 | 403/377 |
| EP | 0 337 518 A1 * | 10/1989 | |
| GB | 2 124 515 A * | 4/1984 | 403/373 |

* cited by examiner

Primary Examiner—Robert J. Sandy
Assistant Examiner—Ruth C. Rodriguez
(74) Attorney, Agent, or Firm—Thomas, Kayden, Horstemeyer & Risley, LLP

(57) ABSTRACT

A joint for a telescoping rod includes a body having a cavity defined in the body to receive a sleeve in the body. A hole is longitudinally defined in a lower portion of the body and communicates with the cavity. The telescoping rod includes an outer tube securely inserted into the hole in the body and an inner tube inserted into the body. The inner tube penetrates the sleeve and is partially received in the outer tube. A locking member is rotatably mounted on the body and has a threaded rod screwed into the sleeve to cause the sleeve to make the inner tube securely abut the inner periphery of the outer tube.

5 Claims, 4 Drawing Sheets

JOINT FOR A TELESCOPING ROD

BACKGROUND OF THE INVENTION

1. Field of the Invention

The present invention relates to a joint, and more particularly to a joint for a telescoping rod.

2. Description of Related Art

With reference to FIG. 6, a conventional joint (60) for a telescoping rod (50) in accordance with the prior art comprises a hollow body (61) having a through hole (611) laterally defined in the body (61) and a nut (62) securely mounted in the through hole (611). A threaded rod (63) with a knob (631) is screwed into the nut (62) and extends into the hollow body (61).

The telescoping rod (50) includes an outer tube (51) and an inner tube (52) slidably received in the outer tube (51). The outer tube (51) has a through hole (511) defined near one end of the outer tube (51). The hollow body (61) is mounted around the end of the outer tube (51) with the through hole (511) to align the through hole (611) in the hollow body (61) with the through hole (511) in the outer tube (51). The threaded rod (63) is screwed through the nut (62) until it extends through the through hole (511) in the outer tube (51) and presses against the inner tube (52). Pressure from the threaded rod (63) causes the inner tube (52) to press against an inner periphery of the outer tube (51) such that the inner tube (52) is held in place in the outer tube (51).

As described, the conventional joint for a telescoping rod (50) can hold the inner tube (52) in place in the outer tube (51). However, the inner tube (52) of the conventional joint (60) is secured in the outer tube (51) by the threaded rod (63) pressing on an outer periphery of the inner tube (52). Pressure from the threaded rod (63) may deform the inner tube (52).

The present invention has arisen to mitigate and/or obviate the disadvantage of the conventional joint for a telescoping rod.

SUMMARY OF THE INVENTION

The main objective of the present invention is to provide an improved joint for a telescoping rod.

To achieve the objective, the joint for a telescoping rod in accordance with the present invention includes a body having a cavity defined in the body to receive a sleeve in the body. A hole is longitudinally defined in a lower portion of the body and communicates with the cavity. The telescoping rod includes an outer tube securely inserted into the hole in the body and an inner tube is inserted into the body. The inner tube penetrates the sleeve and is partially received in the outer tube. A locking member is rotatably mounted on the body and has a threaded rod screwed into the sleeve to cause the sleeve to make the inner tube securely abut the inner periphery of the outer tube. The inner tube is mounted inside the sleeve. The threaded rod is rotated to drive the sleeve, and the threaded rod does not contact the inner tube so the inner tube is not deformed when secured in the outer tube.

Further benefits and advantages of the present invention will become apparent after a careful reading of the detailed description with appropriate reference to the accompanying drawings.

DETAILED DESCRIPTION OF THE INVENTION

Figure 1:
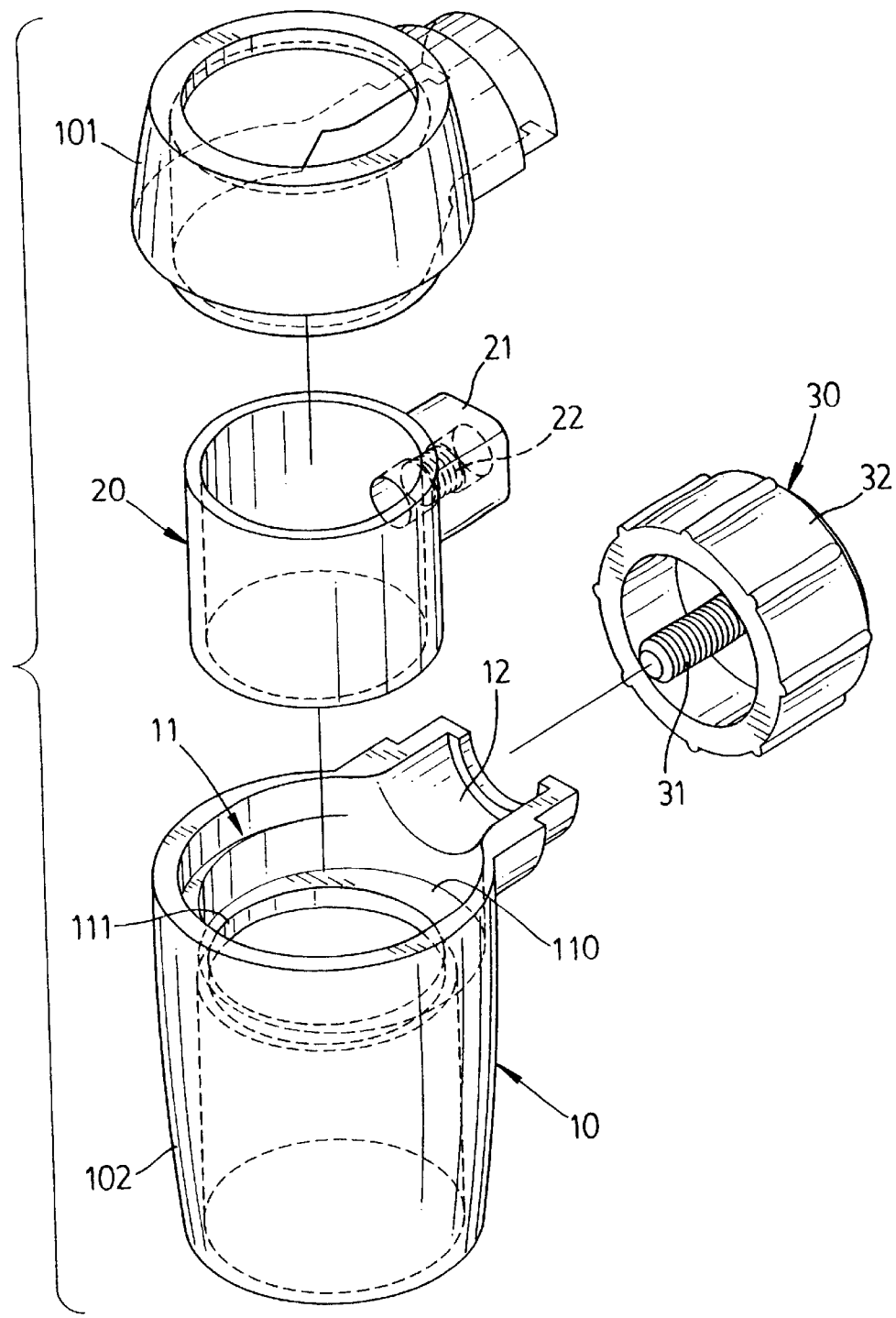
FIG. 1 is an exploded perspective view of a joint for a telescoping rod in accordance with the present invention.
Figure 2:
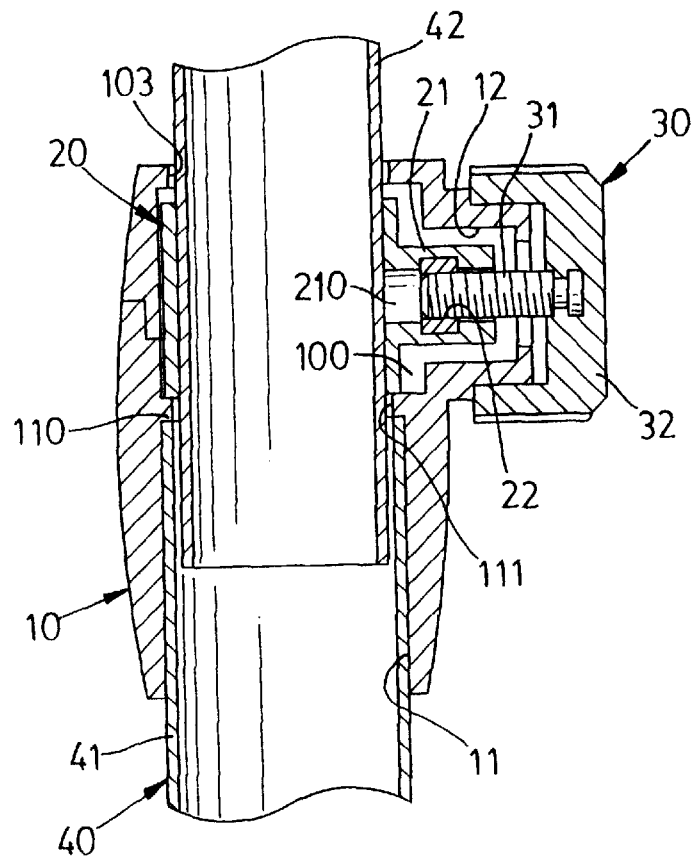
FIG. 2 is a cross sectional side plan view of the joint in FIG. 1 for a telescoping rod.
Figure 3:
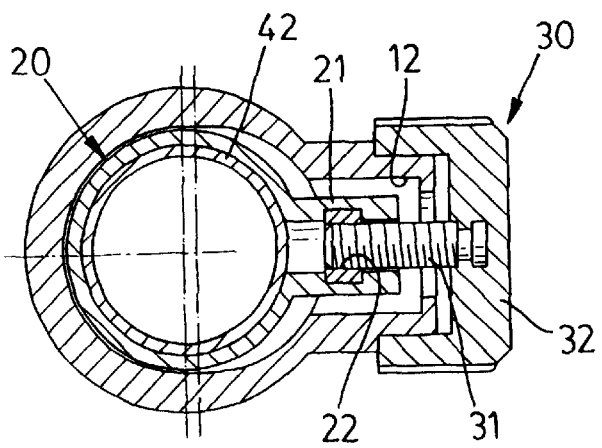
FIG. 3 is a cross sectional top plan view of the joint in FIG. 1 for a telescoping rod.

With reference to the drawings and initially to FIGS. 1, 2 and 3, a joint for a telescoping rod in accordance with the present invention comprises a tubular body (10), a sleeve (20) and a locking member (30). The tubular body (10) is adapted to be mounted around a telescoping rod (40). The sleeve (20) is movably mounted in the tubular body (10). The locking member (30) is rotatably attached to the sleeve (20) to hold the telescoping rod (40) in place inside the tubular body (10). The telescoping rod (40) includes an outer tube (41) and an inner tube (42). The outer tube (41) has a passage (not numbered) longitudinally defined in and extending through the outer tube (41). The passage has a diameter greater than that of the inner tube (42) so that the inner tube (42) is partially and movably received in the outer tube (41).

The tubular body (10) includes an upper casing (101) and a lower casing (102) securely attached to each other to define a cavity (100) in the tubular body (10) between the upper casing (101) and the lower casing (1020) to movably receive the sleeve (20) in the tubular body (10). A first hole (11) is longitudinally defined in the lower casing (102), is adapted to partially receive the outer tube (41) and is eccentric relative to the cavity (100). A shoulder (110) extends from an inner periphery of the lower casing (1020) to define a second hole (111) between the first hole (11) and the cavity (100). The second hold (111) communicates with the cavity (100) and the first hole (11). The second hole (111) co-axially corresponds to the first hole (11) and has a diameter slightly smaller than that of the passage in the outer tube (41). A third hole (103) is defined in a top of the upper casing (101) to allow the inner tube (42) to extend into the body (10). The third hole (103) co-axially corresponds to the second hole (111) and has a diameter slightly greater than that of the passage in the outer tube (41). Each of the upper casing (101) and the lower casing (102) has a curved bracket (not numbered) laterally extending from the body (10) and abutting each other to form a through hole (12) laterally communicating with the cavity (100).

The sleeve (20) includes a threaded portion (21) extending from an outer periphery of the sleeve (20) and is movably received in the through hole (12) in the body (10). A through hole (210) is laterally defined in the threaded portion (21), and a nut (22) with a threaded hole (not numbered) is mounted in the threaded portion (21). The threaded hole in the nut (22) co-axially corresponds to the through hole (210) in the threaded portion (21), and the threaded hole in the nut (22) has a diameter smaller than that of the through hole (210) in the threaded portion (21).

In another embodiment of the present invention, a threaded hole (not shown) is laterally defined in the threaded portion (21) and communicating with the through hole (12) in the body (10).

The locking member (30) comprises a knob (32) rotatably mounted on the body (10) and a threaded rod (31) extending from the knob (32). The threaded rod (31) of the locking member (30) extends into the through hole (12) and is screwed into the threaded hole (22) in the threaded portion (21) of the sleeve (20).

Figure 4:
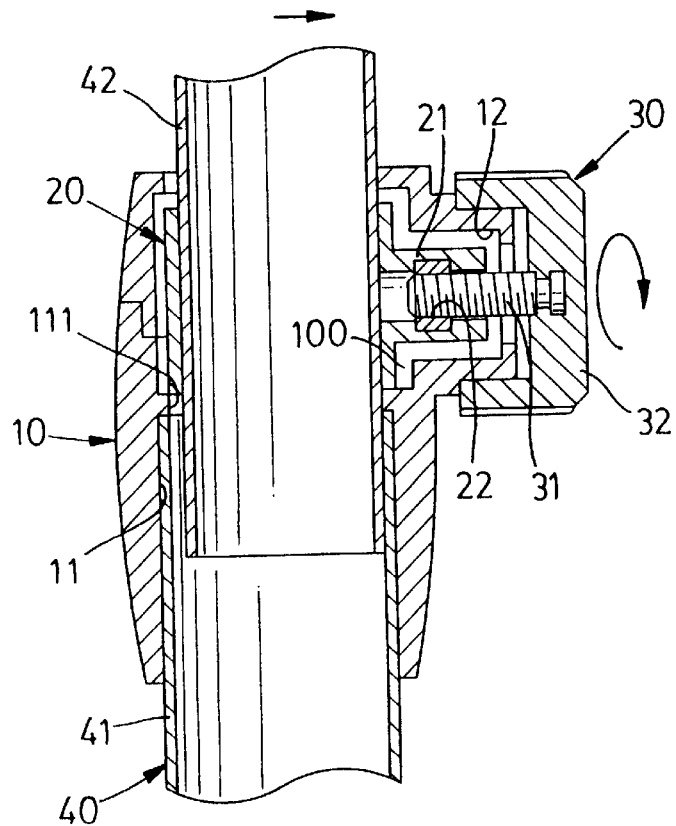
FIG. 4 is an operational cross sectional side plan view of the joint in FIG. 1 for a telescoping rod.
Figure 5:
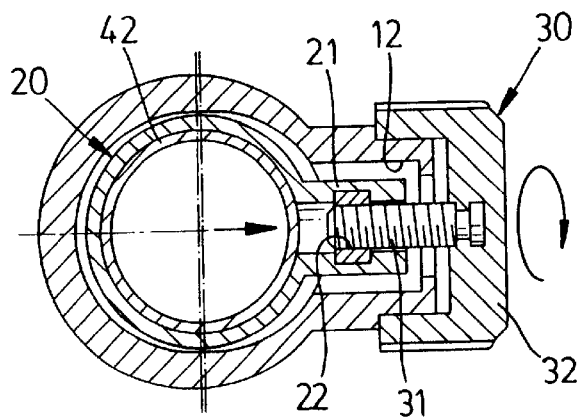
FIG. 5 is an operational cross sectional top plan view of the joint in FIG. 1 for an telescoping rod.
Figure 6:
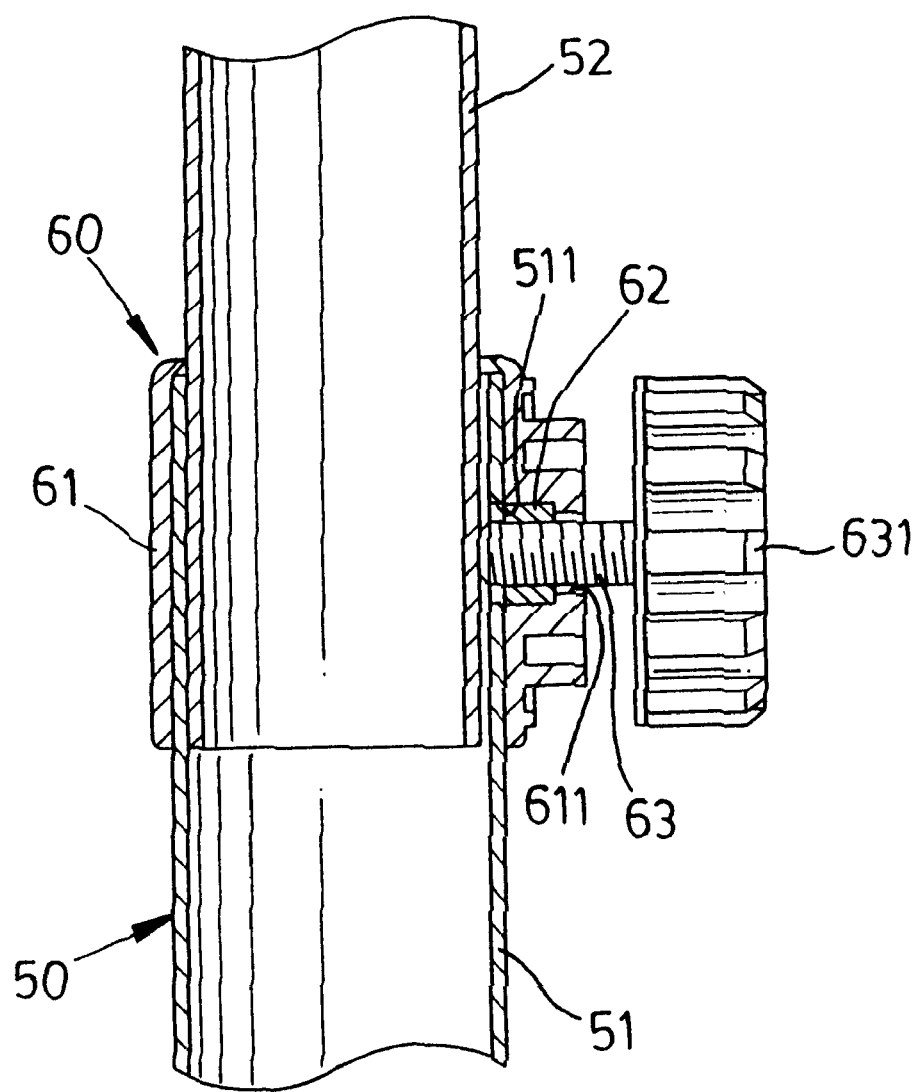
FIG. 6 is a side plan view in partial section of a conventional joint for a telescoping rod in accordance with the prior art.

With reference to FIGS. 4 and 5, the inner tube (42) is inserted into the body (10) via the third hole (103) in the upper casing (101). The inner tube (42) extends through the sleeve (20) and is partially received in the passage in the outer tube (41). The sleeve (20) causes the inner tube (42) to be selectively squeezed against the inner periphery of the outer tube (41) when the knob (32) is rotated such that the inner tube (42) is partially secured in the outer tube (41) when the inner tube (42) extends to a suitable position.

The inner tube (42) is encircled by the sleeve (20), and the threaded rod (31) is rotated to drive the sleeve (20) such that the threaded rod (31) does contact the inner tube (42). Therefore, the inner tube (42) is not deformed when secured in the outer tube (41), and the disadvantage of the conventional joint for a telescoping rod is avoided.

Although the invention has been explained in relation to its preferred embodiment, it is to be understood that many other possible modifications and variations can be made without departing from the spirit and scope of the invention as hereinafter claimed.

What is claimed is:

1. A joint for a telescoping rod that has an outer tube and an inner tube partially received in the outer tube that has a passage longitudinally defined in and extending through the outer tube, the joint comprising:
   a body including:
      a cavity defined in the body to movably hold a sleeve in the body;
      a first hole longitudinally defined in a lower portion of the body, the first hole adapted to receive the outer tube of the telescoping rod, the first hole eccentrically communicating with the cavity and having a diameter smaller than that of the cavity;
      a shoulder radically extending inwardly from an inner periphery of the first hole and situated between the first hole and the cavity; the shoulder defining the second hole communicating with the cavity and the first hole, the second hole having a diameter slightly smaller than that of the passage in the outer tube;
      a through hole laterally defined in the body and communicating with the cavity in the body, the sleeve including a threaded portion extending from an outer periphery of the sleeve and movably received in the through hole in the body;
      a third hole longitudinally defined in an upper portion of the body and communicating with the cavity, the third hole co-axially aligning with the second hole and having a diameter slightly greater than that of the passage in the outer tube, the third hole adapted to allow the inner tube to extend into the body, longitudinally penetrating the sleeve and partially received in the outer tube; and
   a locking member rotatably mounted on the outer periphery of the body, the locking member including a knob and a threaded rod extending from the knob, the threaded rod extending into the body and screwed into the threaded portion of the sleeve to cause the sleeve to make the inner tube selectively securely abut an inner periphery of the passage in the outer tube;
   wherein the body is divided into a first casing and a second casing, the first casing and the second casing securely abut with each other, and the cavity is defined between the first casing and the second casing.

2. The joint for a telescoping rod as claimed in claim 1, wherein the threaded portion of the sleeve comprises a threaded hole laterally defined in the threaded portion and communicating with the through hole in the body, and the threaded rod of the locking member is screwed into the threaded hole in the threaded portion of the sleeve.

3. The joint for a telescoping rod as claimed in claim 1, wherein the threaded portion of the sleeve comprises a through hole laterally defined in the threaded portion and a nut mounted in the threaded portion, the nut including a threaded hole communicating with the through hole in the threaded portion, and the threaded rod of the locking member screwed into the threaded hole in the nut.

4. The joint for a telescoping rod as claimed in claim 1, wherein the threaded portion of the sleeve comprises a threaded hole laterally defined in the threaded portion and communicating with the through hole in the body, and the threaded rod of the locking member is screwed into the threaded hole in the threaded portion of the sleeve.

5. The joint for a telescoping rod as claimed in claim 1, wherein the threaded portion of the sleeve comprises a through hole laterally defined in the threaded portion and a nut mounted in the threaded portion, the nut including a threaded hole communicating with the through hole in the threaded portion and having a diameter smaller than that of the through hole in the threaded portion, and the threaded rod of the locking member screwed into the threaded hole in the nut.

* * * * *